July 3, 1945.    M. J. THOMPSON    2,379,504
DENTAL HYDROCOLLOID CONDITIONING APPARATUS
Filed Aug. 3, 1942
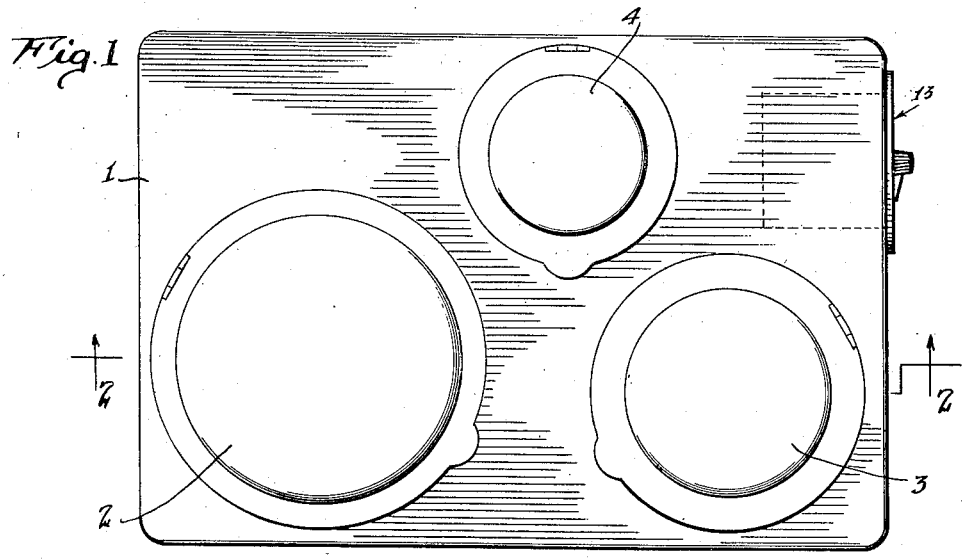
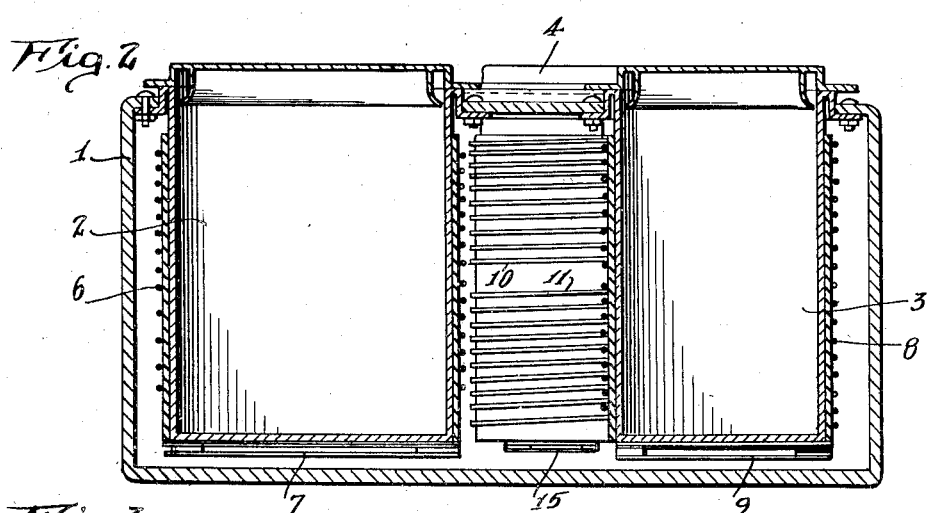
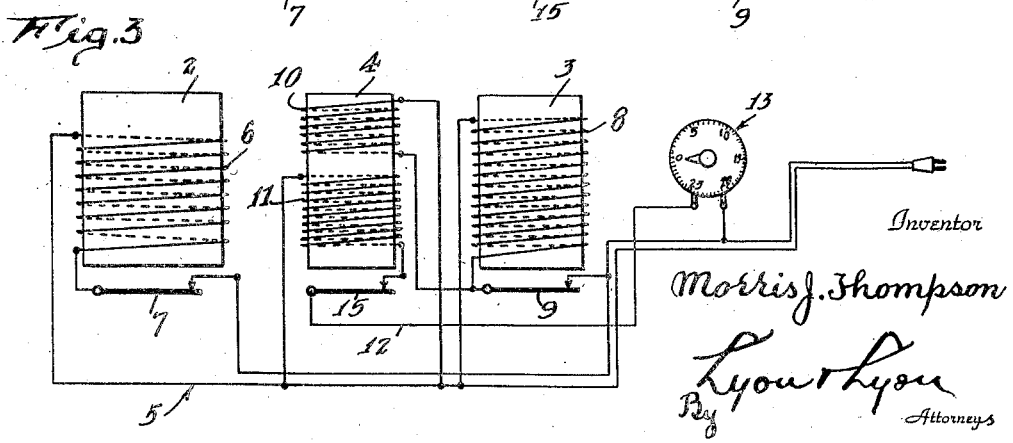
Inventor
Morris J. Thompson
By Lyon & Lyon
Attorneys Patented July 3, 1945

2,379,504

UNITED STATES PATENT OFFICE 2,379,504

DENTAL HYDROCOLLOID CONDITIONING APPARATUS

Morris J. Thompson, Los Angeles, Calif.

Application August 3, 1942, Serial No. 453,315

2 Claims. (Cl. 219—20)

This invention relates to a dental hydrocolloid conditioning apparatus, and more particularly to the production of an apparatus for conditioning quantities of dental hydrocolloid for use at the desired or required condition of fluidity.

This application is a continuation-in-part of my co-pending application, Serial No. 305,488, for Method of and apparatus for taking an impression of a cavity for dental inlay, filed November 21, 1939.

In the handling of dental hydrocolloids as used for the making of impressions, it is necessary to liquefy or render more fluid the said material.

Dental hydrocolloids are used for the making of full or partial mouth impressions and are also utilized according to the disclosure of my co-pending application hereinabove identified for taking of impressions of inlay cavities and preparations. These dental hydrocolloids, of which there are several sold under different trade names, include different ingredients as, for example, mixtures including agar, fibres and other analogous material. These hydrocolloids gel when cooled. They possess the advantage of being easily handled when of the proper fluidity and of producing under proper conditions accurate impressions of the cavity tooth preparation or dental structure on which inlays or models may be produced or made.

It is an object of this invention to provide apparatus for the conditioning of dental hydrocolloids as to fluidity and temperature which enables the operator to place the material in the apparatus and to dismiss from his mind the process of preparing the material.

It is another object of this invention to provide an apparatus which includes a plurality of temperature control baths thermostatically controlled for maintaining the requisite fluidity and temperature of dental hydrocolloid and in which quantities of dental hydrocolloid may be maintained at the varying temperatures desired for use in carrying out the different operations of making dental impressions.

Another object of this invention is to provide a dental hydrocolloid conditioning apparatus in which there is provided means for rapidly raising the temperature of the dental hydrocolloid to a point of maximum for the desired fluidity and for maintaining the dental hydrocolloid at a reduced temperature but of the desired fluidity.

Other objects and advantages of this invention it is believed will be apparent from the following detailed description of a preferred embodiment thereof as illustrated in the accompanying drawing.

In the drawing:

Figure 1 is a top plan view of a dental hydrocolloid conditioning apparatus embodying my invention.

Figure 2 is a vertical sectional view taken substantially on line 2—2 of Figure 1.

Figure 3 is a wiring diagram.

In the preferred embodiment of my invention illustrated in the accompanying drawing, 1 indicates a box which may be of any suitable material in which is mounted a plurality of tempering bath containers 2, 3 and 4 for the tempering and conditioning of dental hydrocolloids. The bath 2 is adapted to be maintained at or about the lowest temperature (i. e., 105°–125° F.) at which the dental hydrocolloid may be maintained fluid for a short period of time. The bath 3 is a tempering bath in which the dental hydrocolloid is conditioned and may be maintained at a temperature of 140° to 160° F., or in other words, at the temperature at which the dental hydrocolloid is maintained fluid and will remain fluid for a number of hours without gelling. The bath 4 is the elevated temperature bath in which the dental hydrocolloid is rendered fluid from its gelled condition. This bath is maintained at a temperature as will hereinafter be set forth as in the neighborhood of 194°–212° F., being preferably maintained at a temperature in the neighborhood of 208° F., or below the boiling temperature of water. Each of the baths 2, 3 and 4 is preferably a water or other liquid bath.

The means provided for maintaining the respective temperatures in the baths 2, 3 and 4 preferably includes an electrical circuit 5 which is adapted to be plugged into any ordinary power circuit. The bath 2 is maintained at the selected temperature of between 105° to 125° F. through the medium of a heating coil 6 which is connected through a thermostat 7 in the power circuit, the thermostat 7 being set to break the electrical supply to the heating element 6 at the desired degree of temperature within this approximate range.

Connected in the circuit is a heating element 8 which surrounds the bath 3 to maintain the water therein at the desired temperature in the approximate range of 140° to 160° F., and there is provided in this circuit a thermostat 9 adapted to interrupt supply of electrical energy to the heating element 8 when the temperature of the water in the bath 3 reaches the selected temperature of between 140° and 160° F. Also connected in the circuit with the heating element 8 is a further heating element 10 which surrounds the high temperature bath 4. This element 10 is adapted to maintain the water within the container 4 at the low limit at which the dental hydrocolloid will remain fluid for an extended period of time. Also surrounding the container 4, or provided in conjunction therewith for the purpose of heating the water therein, is a high temperature heating element 11 which is adapted to raise the temperature of the water within the bath 4 to the temperature required for heating the dental hydrocolloid to a point where it will become fluid. This temperature is between 194° to 212° F., and the temperature preferably utilized for this purpose is around 208° F. or below boiling, and still within the aforesaid range. The purpose of employing a temperature below boiling is to prevent the water within the bath 4 from boiling over or away during the period of time of conditioning the dental hydrocolloid and to insure sufficient depth to cover the hydrocolloid container.

The high temperature heating element 11 is connected into the circuit 5 and in one of the leads 12 of this circuit there is provided a time switch 13 which enables the operator to set the time for the raising of the temperature of the dental hydrocolloid so that he may merely set the time on the time switch 13, place the dental hydrocolloid in the high temperature bath 4, and dismiss the process of conditioning the dental hydrocolloid from further consideration. The operation is that the time switch will determine the period of time at which the water is being raised to the aforesaid preferred temperature of 208° F. and is maintained at such temperature as is selected for liquefying the dental hydrocolloid, or at the other set temperature below boiling which period of time is sufficient to condition the dental hydrocolloid and to render the same fluid. After this period of time, the time switch 13 will operate to cut out the high temperature heat element 11. The temperature of the fluid within the container 4 will then drop to the temperature determined by the intermediate temperature heating element 10 and will be maintained at this temperature as controlled by the 140° to 160° F. thermostat until it is either transferred to one of the other baths 2 or 3 or is utilized. A thermostat 15 is provided in the circuit connected to the heating element 11 to enable control of the temperature of the water in the bath 4 within the range of 194° to 212° F.

The bath 4 is made of a sufficient depth to receive and cover with liquid a package of dental hydrocolloid as it is purchased from the manufacturer so that a whole package of material in its container may be rendered fluid. The baths 3 and 4 are also of a depth so that the dental hydrocolloid carried in injection syringes may be conditioned in the syringes as to the desired temperature for use. The bath 2 is also used to receive a tray or impression of colloid to condition the same.

In my copending application, Serial No. 305,488, I have set forth the process embodying my invention wherein the dental hydrocolloid is utilized in two portions, and having a different fluidity or congealed stages, controlled by a higher and lower temperature bath for the purpose of forming inlay impressions of a tooth preparation or cavity. In this process, with the aid of the controlled temperature bath, it is desirable to have the fluidity of the portion of the dental hydrocolloid which is directly injected into the cavity at a temperature which will insure the material flowing into all crevices or parts of the cavity. I have disclosed that this first portion of dental hydrocolloid is forced into all parts of the cavity and its crevices by a second portion of a larger quantity of dental hydrocolloid which is conditioned for a retarded flow and carried in a tray and forced down over the tooth containing the cavity and onto the material previously injected into the cavity.

Hydrocolloid can be utilized at a high temperature such as 155° F. to fill cavities and cover prepared teeth when applied in small portions. The highly vascular tissues of the mouth absorb and dissipate increased heat (which is given up very slowly by the hydrocolloid). The ready absorption of the heat by the tissues prevents the injury to the tooth and a painful operation to the patient. However, it is very uncomfortable and detrimental to the tissues and teeth to apply a large amount of dental hydrocolloid at a high temperature, for instance, with the second portion in a tray or carrier. The vascular tissues are capable of absorbing a certain amount of heat, but they reach a saturated point and beyond this point the heat is injurious to the anatomical structures and very uncomfortable to the patient.

I have found when these two portions of material are utilized in the manner as described and as described in my copending application that they bond together so that when the larger portion of material is removed from the mouth and away from the teeth, it will carry with it the portion of high temperature hydrocolloid which has been injected into the tooth cavity. Of course, the process of removal is not carried out until after the hydrocolloid has been gelled or cooled to set the same.

Having fully described my invention, it is to be understood that I do not wish to be limited to the the details herein set forth, but my invention is of the full scope of the appended claims.

I claim:

1. In a heating device adapted for conditioning a dental hydrocolloid, the combination of a box having a plurality of liquid containers, one of said containers having means for heating the liquid therein to an elevated temperature of between 194 and 212° F. for a period of time to rapidly change the hydrocolloid to a fluid condition, and a second container adapted to receive the hydrocolloid from the first container, means for heating the liquid in the second container to maintain the temperature therein sufficient to hold the hydrocolloid at a temperature at which it is freely fluid, and a third container adapted to receive the dental hydrocolloid, and means for heating the liquid in the third container to approximately the lowest temperature at which the hydrocolloid is fluid, a timing means adapted to discontinue the heating of the liquid in the first container after a predetermined period of time sufficient to permit the hydrocolloid to become fluid, and heating means operatively associated with the heating means of the second container for holding the temperature of the liquid within the first container from dropping below the temperature of the liquid in the second container.

2. In a heating device for dental hydrocolloid adapted to quickly heat and maintain for a long period of time the dental hydrocolloid in a fluid condition, the combination of a box member having liquid containers therein, one of said containers for said hydrocolloid having a heating means for raising the temperature of the liquid therein to a temperature of between 194 and 212° F., a second liquid container adapted to receive the hydrocolloid from the first container, means for maintaining the temperature of the liquid within the second container at a reduced temperature and at which the hydrocolloid is freely fluid, time means for interrupting the first said heating means, and a heating means for the liquid of the first container operatively associated with the heating means of the second container and operative to hold the liquid in the first container from falling below the temperature of the liquid in the second container.

MORRIS J. THOMPSON.